United States Patent [19]
Belvederi

[11] Patent Number: 5,494,148
[45] Date of Patent: Feb. 27, 1996

[54] METHOD OF FEEDING TOBACCO ITEMS, PARTICULARLY CIGARETTES, TO A CONTINUOUS PACKING MACHINE

[75] Inventor: Bruno Belvederi, Via Giovanni, Italy

[73] Assignee: G.D Societa' Per Azioni, Bologna, Italy

[21] Appl. No.: 274,631

[22] Filed: Jul. 13, 1994

[30] Foreign Application Priority Data

Jul. 13, 1993 [IT] Italy .................................. BO93A0321

[51] Int. Cl.⁶ .................................................. B65G 47/26
[52] U.S. Cl. .............................. 198/433; 53/149; 53/150; 53/151
[58] Field of Search ................................. 198/418.3, 433; 131/282, 283; 53/148–154

[56] References Cited

U.S. PATENT DOCUMENTS 4,306,648 12/1981 Manservisi et al. .................. 198/418.3
4,947,872 8/1990 Gamberini ............................. 131/283
5,070,991 12/1991 Hinchcliffe et al. .................. 198/418.3

FOREIGN PATENT DOCUMENTS 2043018 10/1980 United Kingdom ................ 198/418.3

*Primary Examiner*—Joseph E. Valenza
*Attorney, Agent, or Firm*—Marshall, O'Toole, Gerstein, Murray & Borun

[57] ABSTRACT

A method of feeding tobacco items, particularly cigarettes, to a continuous packing machine, whereby a continuously-moving conveyor, presenting pockets for respective groups composed of a number of superimposed layers of items, is supplied successively with the layers, each of which is withdrawn from a feedbox in a substantially transverse direction in relation to the items in the layer, and by rotating the layer in relation to the items in the adjacent upper layer inside the feedbox.

12 Claims, 3 Drawing Sheets

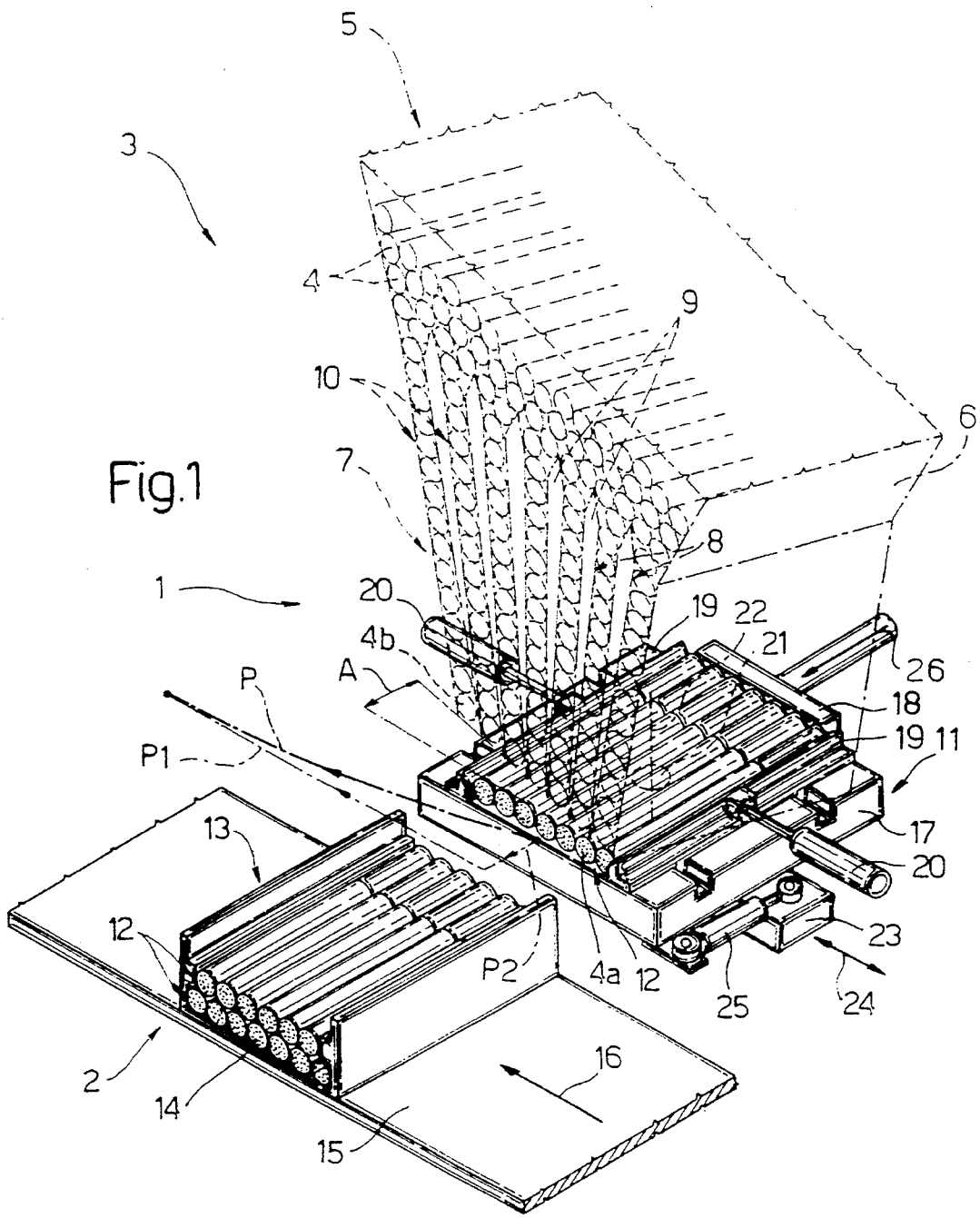

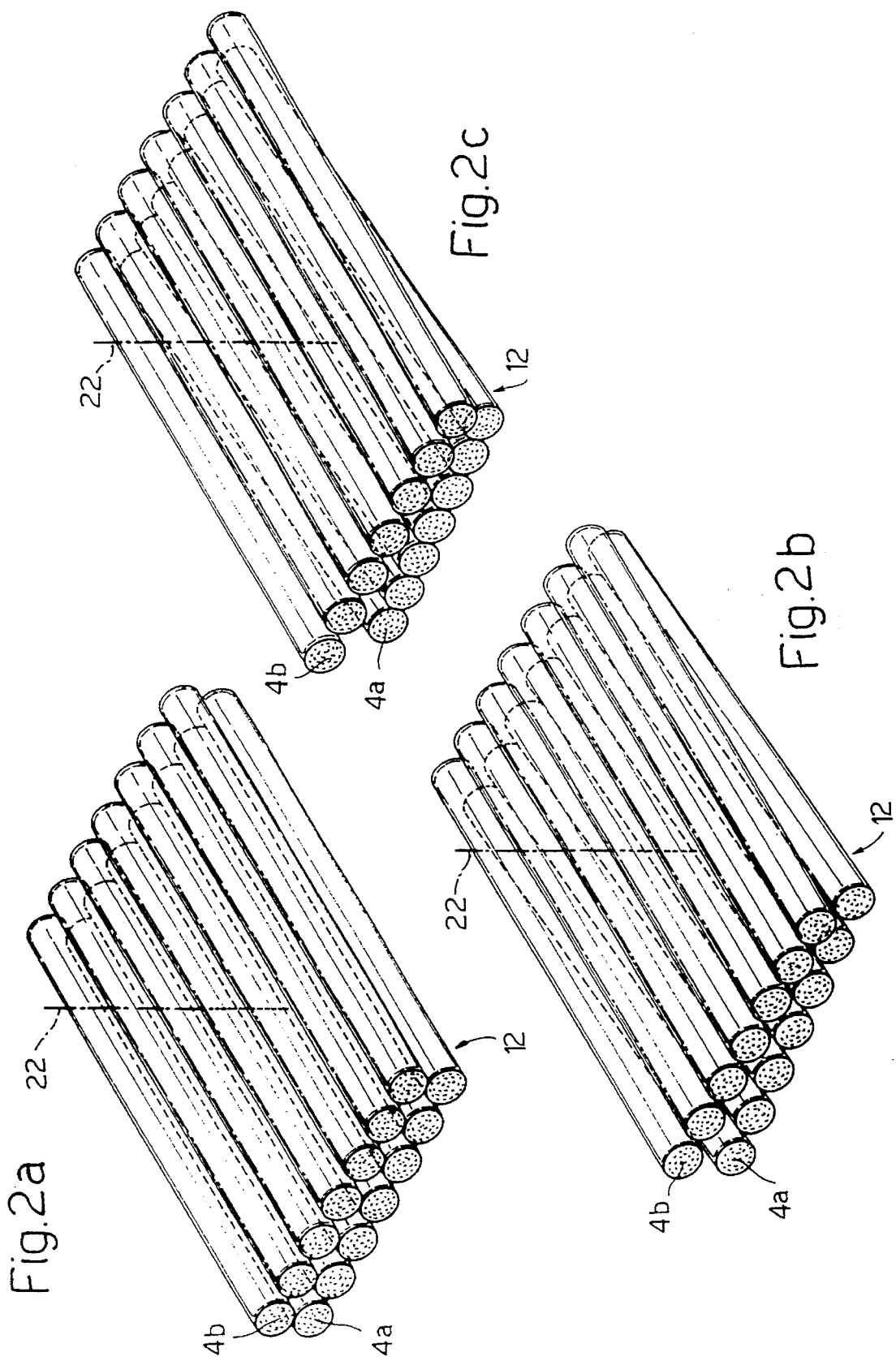

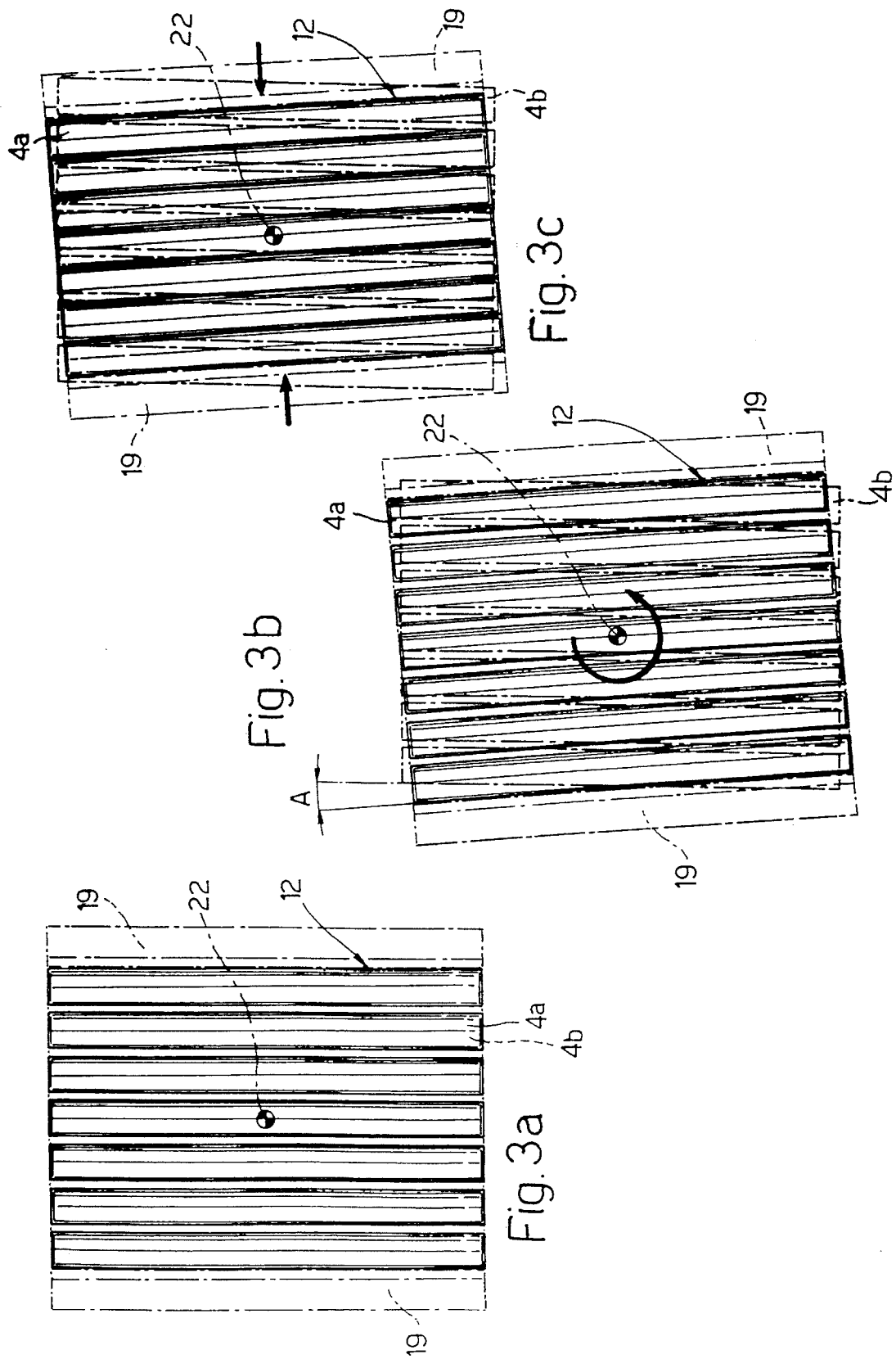

5,494,148

METHOD OF FEEDING TOBACCO ITEMS, PARTICULARLY CIGARETTES, TO A CONTINUOUS PACKING MACHINE

BACKGROUND OF THE INVENTION

The present invention relates to a method of feeding tobacco items, particularly cigarettes, to a continuous packing machine.

In the tobacco industry, reciprocating cigarette packing machines are employed, i.e. wherein the cigarettes travel in steps and are handled by means of reciprocating members.

Reciprocating packing machines feature an input device comprising a cigarette feedbox normally presenting three outlets, each defined by a number of side by side, substantially vertical channels in turn defined by a number of side by side, substantially vertical partitions.

For each outlet, the input device also comprises a fixed box for receiving a layer of cigarettes, and positioned facing the bottom end of the relative channels, and separated from the bottom end of the relative partitions by a distance approximately equal to but no less than the diameter of the cigarettes. The input device also comprises a reciprocating push device for axially engaging the cigarettes in the layer inside the box and expelling them axially from the box into a pocket on a conveyor travelling in steps in a direction perpendicular to the cigarettes inside the feedbox, and which provides for forming groups of cigarettes for supply to the packing machine.

Recently, continuous cigarette packing machines were disclosed in which an input device such as that described above cooperates with a conveyor designed to advance the aforementioned pockets in steps in front of the input device, and in a continuous manner through a transfer station at which the groups of cigarettes are transferred to a continuous packing line.

In practice, the above way of feeding cigarettes to a continuous packing machine proved to be not very brilliant owing to the presence of the above intermittent-continuous conveyor, which is very complicated and expensive in construction, and a very strong source of vibrations.

SUMMARY OF THE INVENTION

It is an object of the present invention to provide a method of feeding continuous packing machines, designed to substantially overcome the above drawbacks.

According to the present invention, there is provided a method of feeding tobacco items, particularly cigarettes, to a continuous packing machine, the method comprising the stages of successively withdrawing groups of items, arranged to form at least one layer, from the bottom end of a feedbox, and successively feeding the groups into the pockets of a conveyor; characterized by comprising the stages of advancing the conveyor continuously and transversely in relation to the items in the feedbox; and of withdrawing each said group from the feedbox in a substantially transverse direction in relation to the items in said layer.

According to a preferred embodiment of the present invention, the withdrawing stage includes the stage of rotating the items forming a bottom group in said feedbox in relation to corresponding items in an adjacent upper layer, and preferably about an axis perpendicular to the items in said bottom group.

According to a preferred embodiment of the present invention, the above method comprises a further stage of transversely compacting the items in the bottom group immediately after rotating it.

BRIEF DESCRIPTION OF THE DRAWINGS

The invention will now be described by way of example with reference to the accompanying drawings, in which:

FIG. 1 shows the input device of a continuous packing machine implementing the method according to the present invention;

FIGS. 2a–2c show in perspective a sequence of movements of a detail in FIG. 1;

FIGS. 3a–3c show a plan views of the FIGS. 2a–2c sequence.

DETAILED DESCRIPTION OF THE INVENTION

Number 1 in FIG. 1 indicates the input device of a packing line 2 of a machine 3 for packing cigarettes 4. More specifically, device 1 comprises a feedbox 5 presenting an upper container 6 and a number of outlets 7 (only one shown), each defined by a number of side by side, substantially vertical channels 8 in turn defined by a number of side by side, substantially vertical partitions 9. Inside each channel 8, cigarettes 4 define a column 10 wherein cigarettes 4 are arranged substantially horizontally one on top of the other.

For each outlet 7, device 1 also comprises a box 11 for successively transferring layers 12 of cigarettes 4 into respective pockets 13, each of which receives a number of superimposed layers 12 defining a group 14 constituting the content of a packet (not shown). Pockets 13 are carried on a conveyor 15 by which they are advanced continuously in a direction 16 forming an angle A with a line transversal to cigarettes 4 in feedbox 5.

Box 11 is designed to assume a loading position facing the bottom end of relative channels 8, and separated from the bottom end of relative partitions 9 by a distance approximately equal to but no less than the diameter of cigarettes 4; in which loading position, box 11 is designed to receive a layer 12 of cigarettes 4, each of which, hereinafter indicated 4a, is positioned beneath a cigarette, hereinafter indicated 4b, constituting the bottom cigarette in a respective column 10. More specifically, each cigarette 4a is positioned with an upper generating line contacting a lower generating line of cigarette 4b which is clamped transversely by the two partitions 9 of respective channel 8.

Box 11 comprises a substantially horizontal plate 17 fitted in known manner (not shown) with a push device 18 movable back and forth in relation to box 11 to engage cigarettes 4a in layer 12 and expel them axially from box 11 into a respective pocket 13. Box 11 also presents two lateral sides 19 parallel to cigarettes 4a and on either side of layer 12, and which are moved towards each other on plate 17 by respective actuators 20, for transversely compacting and bringing cigarettes 4a into contact with one another.

Plate 17 is connected for rotation to a pin 21 presenting a vertical axis 22 and projecting vertically upwards from a slide 23 which is moved back and forth, by a known actuating device (not shown), in a direction 24 substantially parallel to direction 16, so as to move box 11 back and forth between said position wherein layer 12 is loaded, and an unloading position (not shown) wherein layer 12 is transferred into respective pocket 13 by push device 18.

An actuator 25 is provided between plate 17 and slide 23, for rotating box 11 by an angle A about axis 22 and between a first position wherein the travelling direction 26 of push device 18 is parallel to cigarettes 4b, and a second position wherein direction 26 is perpendicular to direction 16.

In actual use, at the start of each cycle for withdrawing layer 12 from the bottom of feedbox 5, box 11 is located beneath respective outlet 7 in the loading position wherein plate 17 is rotated by actuator 25 about axis 22 so as to present sides 19 parallel to partitions 9, and to receive cigarettes 4a parallel to sides 19. As they drop down onto plate 17, cigarettes 4a are positioned, in relation to cigarettes 4b in the adjacent upper layer at the outlets of respective channels 8, as shown in FIG. 2a wherein each cigarette 4a is positioned directly beneath a respective cigarette 4b, is separated from each adjacent cigarette 4a by a distance equal to the thickness of partition 9, but is free to move transversely and horizontally in relation to the adjacent cigarettes 4a; whereas cigarettes 4b are clamped transversely and horizontally in relation to one another by partitions 9.

At this point, actuator 25 is operated to rotate plate 17 by angle A in relation to slide 23 and feedbox 5, and so rotate each cigarette 4a (FIG. 2b) by the same amount in relation to cigarette 4b in the adjacent upper layer; which rotation of cigarette 4a in relation to 4b is effected with substantially no friction by virtue of the two cigarettes 4a, 4b contacting each other along a generating line, and the first being located directly beneath the second. The size of angle A is at least such that, following rotation, an upper lateral generating line of each cigarette 4a intersects a lower lateral generating line of at least two cigarettes 4b, so that the upper generating lines of cigarettes 4a define a supporting surface for, and may move transversely in relation to, cigarettes 4b without cigarettes 4b dropping down between, and transversely clamping, cigarettes 4a.

At this point, cigarettes 4a are compacted transversely (FIG. 2c) by operating actuators 20, and slide 23 is operated to move box 11, together with push device 18, in direction 24 and along a path P1 parallel to direction 16, so that box 11 is aligned and kept aligned with pocket 13. At the same time, push device 18 is operated to move cigarettes 4a axially along a path P2 parallel to direction 26, and so expel cigarettes 4a from box 11 into pocket 13 as pocket 13 and box 11 travel, transversely aligned with each other, in direction 16.

In other words, cigarettes 4a are withdrawn from the bottom of feedbox 5 travelling, as of the loading position, along a substantially transverse path P in relation to their axis, and with substantially no resistance by cigarettes 4b due to the initial rotation of cigarettes 4a about axis 22.

Of course, instead of a single layer 12, a complete group (not shown) of cigarettes, generally including three layers and forming the content of a packet, may be withdrawn at a time from feedbox 5 in the same way as layer 12.

I claim:

1. A method of feeding tobacco items, particularly cigarettes, to a continuous packing machine, the method comprising the stages of successively withdrawing bottom groups of items from the bottom end of a feedbox, the items of each bottom group being arranged to form at least one planar bottom layer within said feedbox, and successively feeding the bottom groups into pockets of a conveyor; the method comprising the stages of advancing the conveyor continuously and transversely in relation to the items in the feedbox; and of withdrawing each said bottom group from the feedbox in a substantially transverse direction in relation to the items in said planar layer; said direction being substantially parallel to said planar layer.

2. A method as claimed in claim 1, wherein said withdrawing stage includes the stage of rotating the items forming the bottom group in said feedbox in relation to corresponding items in an adjacent upper layer.

3. A method as claimed in claim 2, wherein said rotation is effected about an axis perpendicular to the items in said bottom group.

4. A method as claimed in claim 2, wherein said rotation extends through an angle at least such that an upper generating line of each upper item in the bottom group intersects lower generating lines of two items in the adjacent upper layer.

5. A method as claimed in claim 2, further comprising the stage of transversely compacting the items in the bottom group immediately after rotating same.

6. A method as claimed in claim 3, wherein said rotation extends through an angle at least such that an upper generating line of each upper item in the bottom group intersects lower generating lines of two items in the adjacent upper layer.

7. A method of feeding tobacco items, particularly cigarettes, to a continuous packing machine, the method comprising the stages of successively withdrawing bottom groups of items from the bottom end of a feedbox, the items of each bottom group being arranged to form at least one planar bottom layer within said feedbox, and successively feeding the bottom groups into pockets of a conveyor; the method comprising the stages of advancing the conveyor continuously and transversely in relation to the items in the feedbox; and of withdrawing each said bottom group from the feedbox in a substantially transverse direction in relation to the items in said planar layer; the withdrawing stage including the stage of rotating the items forming the bottom group in said feedbox in relation to corresponding items in an adjacent upper layer.

8. A method as claimed in claim 7, wherein said transverse direction is substantially parallel to said planar layer.

9. A method as claimed in claim 7, wherein said rotation is effected about an axis perpendicular to the items in said bottom group.

10. A method as claimed in claim 9, wherein said rotation extends through an angle at least such that an upper generating line of each upper item in the bottom group intersects lower generating lines of two items in the adjacent upper layer.

11. A method as claimed in claim 7, further comprising the stage of transversely compacting the items in the bottom group immediately after rotating same.

12. A method as claimed in claim 8, wherein said rotation is effected about an axis perpendicular to the items in said bottom group.

* * * * *